United States Patent
Lee et al.

(10) Patent No.: US 12,055,524 B2
(45) Date of Patent: Aug. 6, 2024

(54) METHOD FOR EVALUATING STABILITY OF SEPARATOR

(71) Applicant: LG CHEM, LTD., Seoul (KR)

(72) Inventors: Hyun-Sup Lee, Daejeon (KR);
Yeon-Soo Kim, Daejeon (KR);
Sang-Eun Kim, Daejeon (KR);
Dong-Wook Sung, Daejeon (KR);
Dae-Sung Jang, Daejeon (KR);
Myung-Han Lee, Daejeon (KR); Je-An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1071 days.

(21) Appl. No.: 16/959,668

(22) PCT Filed: Mar. 28, 2019

(86) PCT No.: PCT/KR2019/003682
§ 371 (c)(1),
(2) Date: Jul. 1, 2020

(87) PCT Pub. No.: WO2019/190253
PCT Pub. Date: Oct. 3, 2019

(65) Prior Publication Data
US 2021/0080364 A1 Mar. 18, 2021

(30) Foreign Application Priority Data
Mar. 28, 2018 (KR) .................. 10-2018-0035897

(51) Int. Cl.
*G01N 3/18* (2006.01)
*H01M 50/403* (2021.01)

(52) U.S. Cl.
CPC ............ *G01N 3/18* (2013.01); *H01M 50/403* (2021.01); *G01N 2203/0226* (2013.01)

(58) Field of Classification Search
CPC ............ G01N 3/18; G01N 2203/0226; H01M 50/403
See application file for complete search history.

(56) References Cited

U.S. PATENT DOCUMENTS

2006/0222943 A1   10/2006   Fujikawa et al.
2007/0238017 A1*  10/2007   Call ..................... H01M 50/457
                                                                    156/229
(Continued)

FOREIGN PATENT DOCUMENTS

CN        1578806 A      2/2005
CN      101174679 A      5/2008
(Continued)

OTHER PUBLICATIONS

16959668_2023-12-16_JP_4129112_B2_H.pdf, Aug. 6, 2008.*
(Continued)

*Primary Examiner* — Gail Kaplan Verbitsky
(74) *Attorney, Agent, or Firm* — Birch, Stewart, Kolasch & Birch, LLP

(57) ABSTRACT

A method for evaluating the stability of a separator, including the steps of: preparing a separator; determining the elongation properties of the separator by using dynamic mechanical analysis (DMA); comparing the determined value with the stability standards of the elongation properties; and classifying a separator as a stability-passing separator when the determined values satisfy the stability standards, and classifying a separator as a stability-failing separator when the determined values do not satisfy the stability standards, after the comparison.

3 Claims, 4 Drawing Sheets

(56) References Cited

U.S. PATENT DOCUMENTS

| | | |
|---|---|---|
| 2010/0305217 A1 | 12/2010 | Qiu et al. |
| 2012/0077113 A1 | 3/2012 | Kim et al. |
| 2012/0132583 A1 | 5/2012 | Son et al. |
| 2013/0034777 A1* | 2/2013 | Takita ............... H01M 50/406 |
| | | 521/143 |
| 2013/0196251 A1 | 8/2013 | Di Noto et al. |
| 2014/0030608 A1* | 1/2014 | l'Abee et al. .......... H01G 11/52 |
| | | 264/41 |
| 2014/0295061 A1 | 10/2014 | Lee et al. |
| 2017/0012266 A1 | 1/2017 | Arora et al. |
| 2017/0155112 A1* | 6/2017 | Ozeki ................ H01M 50/469 |
| 2017/0294638 A1 | 10/2017 | Joo et al. |
| 2018/0074131 A1 | 3/2018 | Lim et al. |
| 2018/0185835 A1 | 7/2018 | Jaber et al. |
| 2018/0212219 A1 | 7/2018 | Kim et al. |

FOREIGN PATENT DOCUMENTS

| | | | | |
|---|---|---|---|---|
| CN | 102339965 A | | 2/2012 | |
| CN | 103811701 A | | 5/2014 | |
| CN | 103311500 B | * | 2/2016 | |
| CN | 105406078 A | * | 3/2016 | ........ H01M 10/0525 |
| DE | 102023205104 A1 | * | 12/2023 | ........ H01M 50/417 |
| EP | 2075126 A1 | * | 7/2009 | ............. B29C 55/02 |
| EP | 2 111 909 A1 | | 10/2009 | |
| EP | 4099471 A1 | * | 12/2022 | ........ H01M 50/417 |
| ES | 2428094 T3 | * | 11/2013 | ........... B01D 69/125 |
| JP | WO2004085525 A1 | * | 10/2004 | |
| JP | WO2002092677 A1 | * | 3/2005 | |
| JP | 2005343957 A | * | 12/2005 | |
| JP | WO2004020511 A1 | * | 12/2005 | |
| JP | 4129112 B2 | * | 8/2008 | ........ H01M 10/0525 |
| JP | 4234392 B2 | * | 3/2009 | |
| JP | 4234398 B2 | * | 3/2009 | |
| JP | 4460668 B2 | * | 5/2010 | |
| JP | 2012-529742 A | | 11/2012 | |
| JP | 2016-139490 A | | 8/2016 | |
| JP | 2017-203145 A | | 11/2017 | |
| JP | 2016-139489 A | | 8/2018 | |
| JP | 2023071750 A | * | 5/2023 | ............. B01J 41/13 |
| KR | 10-2007-0065301 A | | 6/2007 | |
| KR | 10-2013-0098329 A | | 9/2013 | |
| KR | 10-2014-0126978 A | | 11/2014 | |
| KR | 10-2015-0036701 A | | 4/2015 | |
| KR | 10-2015-0144848 A | | 12/2015 | |
| KR | 10-1574813 B1 | | 12/2015 | |
| KR | 10-1657307 B1 | | 9/2016 | |
| KR | 10-2017-0025434 A | | 3/2017 | |
| KR | 10-2017-0030356 A | | 3/2017 | |
| KR | 10-2017-0032722 A | | 3/2017 | |
| KR | 10-2017-0116817 A | | 10/2017 | |
| KR | 10-2018-0019732 A | | 2/2018 | |
| WO | WO-2012050406 A2 | * | 4/2012 | ............. H01M 2/14 |

OTHER PUBLICATIONS

16959668_2023-12-15_WO_2012050406_A2_H.pdf,Apr. 19, 2012.*
16959668_2024-03-25_DE_102023205104_A1_H.pdf,Dec. 7, 2023.*
16959668_2024-03-25_EP_4099471_A1_H.pdf,Dec. 7, 2022.*
International Search Report for PCT/KR2019/003682 mailed on Jul. 29, 2019.
Baldwin et al., "Battery Separator Characterization and Evaluation Procedures for NASA's Advanced Lithium-Ion Batteries", May 2010 (May 2010), pp. 1-59 (total 68), XP055608606, Retrieved from the Internet: URL:https://ntrs.nasa.gov/archive/nasa/casi.ntrs.nasa.gov/20100021170.pdf.
Extended European Search Report for European Application No. 19774539.1, dated Jan. 22, 2021.

* cited by examiner

METHOD FOR EVALUATING STABILITY OF SEPARATOR

TECHNICAL FIELD

The present disclosure relates to a method for evaluating the stability of a separator. Particularly, the present disclosure relates to a method for evaluating the stability of a separator which can predict the safety of a separator against explosion before a nail test of a battery.

The present application claims priority to Korean Patent Application No. 10-2018-0035897 filed on Mar. 28, 2018 in the Republic of Korea, the disclosures of which including the specification and drawings are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte. However, such a lithium ion battery uses an organic electrolyte, and thus has safety-related problems, such as ignition and explosion, and shows difficulty in manufacture.

Recently, a lithium ion polymer battery improves the above-mentioned shortcomings of a lithium ion battery, and thus is given many attentions as one of the next-generation batteries. However, such a lithium ion polymer battery has relatively low capacity as compared to a lithium ion battery, and particularly shows insufficient discharge capacity at low temperature. Thus, there is an imminent need for improving the lithium ion polymer battery.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator.

To solve the problem, there is a need for carrying out evaluation of the stability of a separator. However, conventional methods for evaluating the safety of a separator against explosion have been carried out by assembling an actual battery. Thus, such methods require a significant time and cost.

Therefore, there is still a need for a method for rapidly evaluating whether a separator satisfies the safety standards or not.

DISCLOSURE

Technical Problem

The present disclosure is directed to providing a method for evaluating the stability of a separator which can predict safety against explosion through simple evaluation of rheological properties.

Technical Solution

In one aspect of the present disclosure, there is provided a method for evaluating the stability of a separator according to any one of the following embodiments.

According to the first embodiment of the present disclosure, three is provided a method for evaluating the stability of a separator, including the steps of:

preparing a separator;

determining the elongation properties of the separator by using dynamic mechanical analysis (DMA);

comparing the determined elongation properties of the separator with the predetermined stability standards of the elongation properties; and classifying a separator as a stability-passing separator when the determined values satisfy the stability standards, and classifying a separator as a stability-failing separator when the determined values do not satisfy the stability standards, after the comparison, wherein the elongation properties are a breaking temperature and a shrinkage of the separator, and the stability standards are defined as a breaking temperature of 200° C. or higher and a shrinkage of 59% or less, or the elongation properties are a breaking load and elongation at a break of the separator, and the stability standards are defined as a breaking load of 0.02N or more and an elongation at break of 1% or more.

According to the second embodiment of the present disclosure, there is provided the method for evaluating the stability of a separator as defined in the first embodiment further comprises performing a nail penetration test on the separator by fully charging a battery housing the separator at 25° C. under a voltage of 4.25V, penetrating a nail having a diameter of 3 mm through the center of each battery, and evaluating the battery as failing the nail penetration test, when it causes ignition of the battery, and as passing the nail penetration test when it does not cause ignition of the battery.

According to the third embodiment of the present disclosure, there is provided the method for evaluating the stability of a separator as defined in the first or the second embodiment, wherein the separator includes: a porous polymer substrate separator; an organic/inorganic composite separator which has a porous coating layer disposed on at least one surface of the porous polymer substrate, and including a plurality of inorganic particles and a binder polymer disposed partially or totally on the surface of the inorganic particles to connect and fix the inorganic particles with each other; or a combination of the porous polymer substrate separator and the organic/inorganic composite separator.

According to the fourth embodiment of the present disclosure, there is provided the method for evaluating the stability of a separator as defined in any one of the first to the third embodiments, wherein the breaking temperature of the separator is determined by measuring the temperature at which point a separator sample having a width of 6.1 mm is broken or elongated within a temperature ranging from 25° C. to 350° C. at a warming rate of 5° C./min under a load of 0.005N, by using DMA.

According to the fifth embodiment of the present disclosure, there is provided the method for evaluating the stability of a separator as defined in any one of the first to the fourth embodiments, wherein the shrinkage of the separator is determined by determining the shrinkage of a separator sample having a width of 6.1 mm within a temperature ranging from 25° C. to 350° C. at a warming rate of 5° C./min under a load of 0.005N by using DMA, and the shrinkage is calculated according to the formula of [(initial length of separator sample)−(minimum length of separator sample)/(initial length of separator sample)×100].

According to the sixth embodiment of the present disclosure, there is provided the method for evaluating the stability of a separator as defined in any one of the first to the fifth embodiments, wherein the breaking load and elongation at break of the separator are determined by measuring the load and elongation upon the generation of break by using DMA, when a separator sample having a width of 6.1 mm and a length of 10 mm is subjected to a load increased from 0.002N at a rate of 0.001N/min at a temperature of 200°0 C.

Advantageous Effects

According to an embodiment of the present disclosure, significant factors of rheological properties which affect the safety of a separator are derived in order to select separators having excellent safety against explosion, thereby predicting the stability of a separator simply and rapidly.

The method for evaluating the stability of a separator provides results matched with a nail test of secondary batteries including the same separator. Thus, there is no need for assembling a secondary battery additionally to evaluate the stability.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
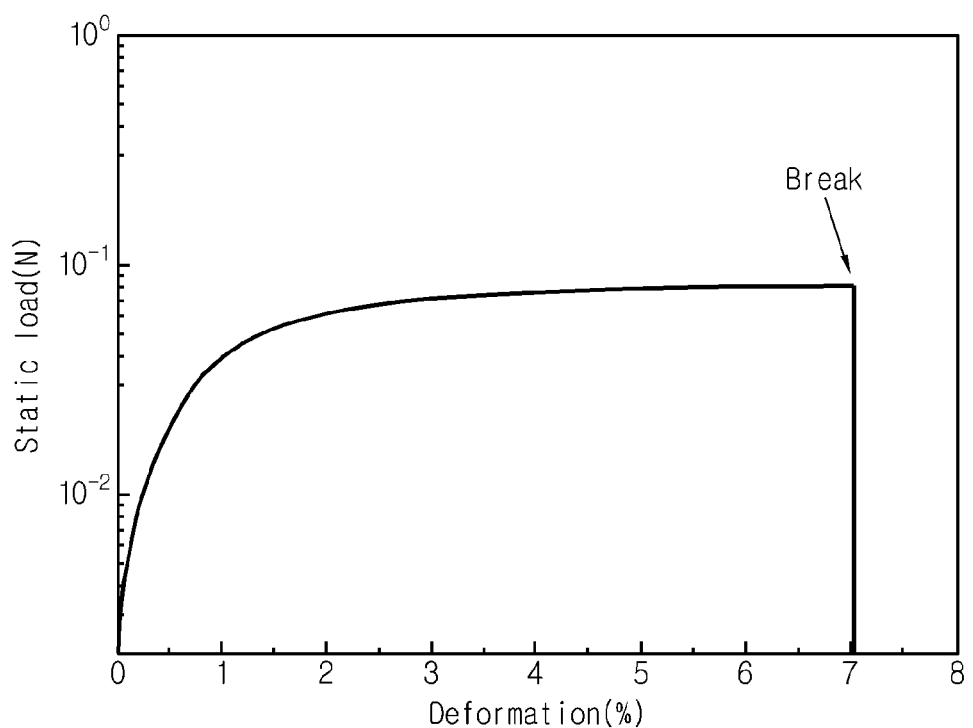
FIG. 1 is a graph illustrating deformation and static load during a break-off test of a separator.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In general, a separator for a secondary battery uses a porous polymer substrate. For example, in the case of a conventional polyolefin-based porous polymer substrate, its viscosity is decreased at low temperature and the porous polymer substrate shows liquid-like behaviors. Then, the separator applied to a battery is damaged in a nail test (nail penetration test), which causes significant degradation of the safety of the secondary battery against explosion.

Under these circumstances, according to the present disclosure, significant factors of rheological properties which are closely related with prediction of the safety of a secondary battery are derived among the rheological property values of the porous polymer substrate forming a separator, and then the factors are evaluated to predict the stability of a finished secondary battery.

In one aspect of the present disclosure, there is provided a method for evaluating the stability of a separator, including the steps of:

preparing a separator;

determining the elongation properties of the separator by using dynamic mechanical analysis (DMA), and comparing the determined value with the stability standards of the elongation properties; and classifying a separator as a stability-passing separator when the determined values satisfy the stability standards, and classifying a separator as a stability-failing separator when the determined values do not satisfy the stability standards, after the comparison, wherein the elongation properties are the breaking temperature and shrinkage of the separator, and the stability standards are defined as a breaking temperature of 200° C. or higher and a shrinkage of 59% or less, or the elongation properties are the breaking load and elongation at break of the separator, and the stability standards are defined as a breaking load of 0.02N or more and an elongation at break of 1% or more.

First, a separator whose stability is to be evaluated is prepared.

The separator may include a porous polymer substrate separator, an organic/inorganic composite separator which has a porous coating layer disposed on at least one surface of the porous polymer substrate, or a mixed separator thereof.

The polymer forming the porous polymer substrate is not particularly limited, as long as it shows the above-described melt characteristics. Non-limiting examples of the polymer include polyolefin and modified polyolefin, which are used alone or in combination. In addition, when two or more such polymers are used, they may be incorporated to a single layer to form a porous polymer substrate, or they may be a composite layer having two or more layers in which each layer includes a different polymer. In the latter case, at least one layer of the composite layer may include a mixture of two or more polymers.

Herein, the polyolefin may include a polyolefin-based polymer, such as polyethylene including high-density polyethylene, linear low-density polyethylene, low-density polyethylene or ultrahigh-molecular weight polyethylene, polypropylene, polybutylene, polypentene, or the like, and such polyolefin-based polymers may be used alone or in combination.

The modified polyolefin may be a copolymer of an olefin (e.g. ethylene, propylene, or the like) with a C2-C20 alphaolefin. The alpha-olefin may be at least one selected from the group consisting of 1-butene, 1-pentene, 1-hexene, 4-methyl-1-pentene, 1-octene, 1-decene, 1-dodecene, 1-tetradecene, 1-hexadecene, 1-octadecene and 1-eicosene, or a structure containing at least one of vinyl group, ketone group, ester group and acid group in the polymer chain. In the ethylene/alpha-olefin copolymer, the content of alpha-olefin may be about 0.5-10 wt %, preferably about 1-5 wt %, but is not limited thereto.

According to an embodiment of the present disclosure, the polyethylene may be an ultrahigh-molecular weight polyethylene; polyethylene other than high-molecular weight polyethylene; or an ultrahigh-molecular weight polyethylene having a weight average molecular weight of 600,000 or more (e.g. 600,000-3,000,000). Herein, the ultrahigh-molecular weight polyethylene may be an ethylene homopolymer or a copolymer thereof containing a small amount of alpha-olefin. The alpha-olefin may have any one branch selected from a vinyl group, ketone group, methyl group, ester group and an acid group, or may have two or more such branches.

The polyethylene other than high-molecular weight polyethylene may be at least one selected from high-density polyethylene, medium-density polyethylene, branched low-density polyethylene and linear low-density polyethylene.

According to another embodiment of the present disclosure, the polypropylene may be propylene homopolymer or a copolymer thereof containing an alpha-olefin. The alpha-olefin is the same as described above.

According to still another embodiment of the present disclosure, the polymer may be a blend of polyethylene with polypropylene, wherein polypropylene may be present in an amount of 5 wt % or less based on the total polymer. Herein, polyethylene and polypropylene are the same as described above.

In addition, the porous polymer substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

It is required for the polymer forming the porous polymer substrate to have a predetermined Z average molecular weight, melt index (MI) and branch content so that the porous polymer substrate may have the above-described improved rheological properties.

According to an embodiment of the present disclosure, the polymer may have a Z average molecular weight ($M_z$) of 500,000-2,000,000, 600,000-1,800,000, or 800,000-1,300,000.

Although there is no particular limitation in the thickness of the porous polymer substrate, the porous polymer substrate has a thickness of 1-100 μm, particularly 5-50 μm. Although there is no particular limitation in the size of the pores present in the porous polymer substrate and porosity, the pore size and porosity may be 0.01-50 μm and 10-95%, respectively.

According to an embodiment of the present disclosure, the organic/inorganic composite separator may further include a porous coating layer formed on at least one surface of the porous polymer substrate, and including a plurality of inorganic particles and a binder polymer positioned on the whole or a part of the surface of the inorganic particles to connect the inorganic particles with each other and fix them.

The binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with each other, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose.

The weight ratio of the inorganic particles to the binder polymer may be 50:50-99:1, particularly 70:30-95:5. When the weight ratio of the inorganic particles to the binder polymer satisfies the above-defined range, the problem of a decrease in pore size and porosity of the resultant coating layer caused by an increased content of the binder polymer may be solved, and also the problem of degradation of peeling resistance of the resultant coating layer caused by a decreased content of binder polymer may be solved.

The separator according to an embodiment of the present disclosure may further include other additives as ingredients of the porous coating layer, besides the inorganic particles and binder polymer.

According to the present disclosure, the inorganic particles may be inorganic particles having a dielectric constant of 5 or more, particularly 10 or more, inorganic particles having lithium ion transportability or a mixture thereof.

The inorganic particles having a dielectric constant of 5 or more may include any one selected from the group consisting of $BaTiO_3$, $Pb(Zr,Ti)O_3$ (PZT), $Pb_{1-x}La_xZr_{1-y}Ti_yO_3$ (PLZT), $Pb(Mg_3Nb_{2/3})O_3PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, AlO(OH), $Al_2O_3·H_2O$, $TiO_2$, SiC, or a mixture of two or more of them.

As used herein, 'inorganic particles having lithium ion transportability' refers to inorganic particles containing a lithium element and transporting lithium, not storing lithium. Non-limiting examples of the inorganic particles having lithium ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4$—$Li_2S$—$SiS_2$ and $P_2S_5$-based glass ($Li_xP_yS_z$, $0<x<3$, $0<y<3$, $0<z<7$) such as LiI—$Li_2S$—$P_2S_5$, or a mixture thereof.

According to another embodiment of the present disclosure, the inorganic particles may have an average particle diameter of 0.05-3 μm, particularly 0.1-2.7 μm, and more particularly 0.5-2.5 μm.

Although there is no particular limitation in the thickness of the porous coating layer, the porous coating layer may have a thickness of 1-10 μm, particularly 1.5-6 μm. In addition, the porous coating layer preferably has a porosity of 35-65%, but is not limited thereto.

Next, the elongation properties of the separator are determined by using dynamic mechanical analysis (DMA).

The elongation properties of the separator may be determined by the standard method using a dynamic mechanical analyzer, particularly Q800 DMA system available from TA Instruments (US).

The elongation properties are the breaking temperature and shrinkage of the separator, and the stability standards are defined as a breaking temperature of 200° C. or higher and a shrinkage of 59% or less, or the elongation properties are the breaking load and elongation at break of the separator, and the stability standards are defined as a breaking load of 0.02N or more and an elongation at break of 1% or more.

First, an embodiment, wherein the elongation properties are the breaking temperature and shrinkage of the separator, and the stability standards are defined as a breaking temperature of 200° C. or higher and a shrinkage of 59% or less, will be explained.

According to an embodiment of the present disclosure, the breaking temperature of the separator may be defined as the temperature at which point a separator sample having a width of 6.1 mm is broken or elongated within a temperature ranging from 25° C. to 350° C. at a warming rate of 5° C./min under a load of 0.005N, by using the DMA system in a tension mode.

The length of the sample may be controlled suitably according to the test system. For example, the sample may have a length of 8-20 mm, particularly 10-11 mm, and more particularly 10.3 mm. In addition, the thickness of the sample may be controlled suitably according to the test system. For example, the sample may have a thickness of 20 μm or less, particularly 7-20 μm.

In addition, the temperature at which point the separator sample is elongated may be determined by the temperature at which point the deformation of the separator sample is increased by 10% or more in the positive (+) direction within a temperature change of 5° C. in a graph (see, FIG. 2) illustrating deformation as a function of temperature in dynamic mechanical analysis (DMA).

The shrinkage of the separator is determined by determining the shrinkage of a separator sample having a width of 6.1 mm within a temperature ranging from 25° C. to 350° C. at a warming rate of 5° C./min under a load of 0.005N by using dynamic mechanical analysis (DMA), and the shrinkage may be calculated according to the formula of [(initial length of separator sample)−(minimum length of separator sample)/(initial length of separator sample)×100]. The term 'minimum length of separator sample' means the 'length' of the separator sample when it is shrunk thermally and has the shortest length during heating under the above-mentioned condition, as determined by using dynamic mechanical analysis. When a separator is judged as a stability-failing separator after the evaluation of stability, the shortest length may be the length right before the separator sample is broken or elongated. The determined values are compared with the stability standards defined by a breaking temperature of 200° C. or higher and a shrinkage of 59% or less.

After the determination, when a separator satisfies a breaking temperature of 200° C. or higher and a shrinkage of 59% or less at the same time, it can be stated that the separator is hardly deformed even under heat generated by a contact between a positive electrode and a negative electrode, the separator has a low shrinkage so that a void or space that may be generated in a battery due to a change in volume of the separator is small sufficient to prevent generation of excessive heat or explosion, and thus it is possible to ensure stability of the separator and that of the battery.

After comparing the determined values with the stability standards defined by a breaking temperature of 200° C. or higher and a shrinkage of 59% or less, a separator is defined as a stability-passing separator when the determined values satisfy the stability standards, and a separator is defined as a stability-failing separator when the determined values do not satisfy the stability standards.

Then, an embodiment, wherein the elongation properties are the breaking load and elongation at break of the separator, and the stability standards are defined as a breaking load of 0.02N or more and an elongation at break of 1% or more, will be explained.

According to an embodiment, the breaking load and elongation at break of the separator may be determined by measuring the load and elongation upon the generation of break by using dynamic mechanical analysis (DMA), when a separator sample having a width of 6.1 mm and a length of 10 mm is subjected to a load increased from 0.002N at a rate of 0.001N/min at a temperature of 200° C.

FIG. 1 is a graph illustrating deformation and static load during a break-off test of a separator. Referring to FIG. 1, the load and elongation at break mean those at the point where a separator having a predetermined dimension is not deformed any longer but is broken while the load applied thereto is increased to cause deformation of the length of the separator.

The length of the sample may be controlled suitably according to the test system. For example, the sample may have a length of 8-20 mm, particularly 10-11 mm, and more particularly 10.3 mm. In addition, the thickness of the sample may be controlled suitably according to the test system. For example, the sample may have a thickness of 20 μm or less, particularly 7-20 μm.

The determined values are compared with the stability standards defined by a breaking load of 0.02N or more and an elongation at break of 1% or more.

After the determination, when a separator satisfies a breaking load of 0.02N or more and an elongation at break of 1% or more at the same time, it can be stated that the separator is not damaged easily by external impact or heat and thus provides a battery with improved stability against explosion.

After comparing the determined values with the stability standards defined by a breaking load of 0.02N or more and an elongation at break of 1% or more, a separator is defined as a stability-passing separator when the determined values satisfy the stability standards, and a separator is defined as a stability-failing separator when the determined values do not satisfy the stability standards.

The stability-passing separator and the stability-failing separator are evaluated as passing and failing a nail penetration test, respectively, when the nail penetration test is carried out by using secondary batteries including the same separators.

In a nail penetration test, a positive electrode is in contact with a negative electrode to cause exothermal reaction and the heat emission temperature at that time is significantly high. Therefore, since the method for evaluating the stability of a separator simulates such thermal environment generated in an actual nail penetration test to the highest degree, it is expected that a battery using a separator judged from the evaluation as one causing no break and having a low shrinkage at high temperature will be evaluated as having the same stability in a nail penetration test.

Thus, since the method for evaluating the stability of a separator according to the present disclosure provides results matched with the results of a nail penetration test for a secondary battery including the separator, it is possible to predict the stability of a secondary battery merely by evaluating rheological properties of a separator, while eliminating an additional test including assemblage of a secondary battery.

Herein, the nail penetration test is performed by fully charging the secondary batteries at 25° C. under a voltage of 4.25V, penetrating a nail having a diameter of 3 mm through the center of each battery, and evaluating a battery as failing the nail penetration test, when it causes ignition, and a battery as passing the nail penetration test when it causes no ignition.

The secondary battery may be obtained by using a conventional cathode and anode, inserting a separator between the both electrodes to form an electrode assembly, introducing the electrode assembly to a battery casing, and injecting an electrolyte thereto.

Herein, the cathode and anode are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a mixture thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Sample A

A polyethylene porous membrane having the physical properties as shown in the following Table 1 was prepared as a separator according to Sample A.

<Manufacture of Cathode and Anode>

First, 96.7 parts by weight of $Li[Ni_{0.6}Mn_{0.2}Co_{0.2}]O_2$ functioning as a cathode active material, 1.3 parts by weight of graphite functioning as a conductive material and 2.0 parts by weight of polyvinylidene fluoride (PVDF) functioning as a binder were mixed to obtain a cathode mixture. The resultant cathode mixture was dispersed in 1-methyl-2-pyrrolidone functioning as a solvent to obtain a cathode mixture slurry. The slurry was coated on both surfaces of aluminum foil having a thickness of 20 μm, followed by drying and compression, to obtain a cathode.

Next, 97.6 parts by weight of artificial graphite and natural graphite (weight ratio 90:10) functioning as anode active materials, 1.2 parts by weight of styrene-butadiene rubber (SBR) and 1.2 parts by weight of carboxymethyl cellulose (CMC) functioning as a binder were mixed to obtain an anode mixture. The anode mixture was dispersed in ion exchange water functioning as a solvent to obtain anode mixture slurry. The slurry was coated on both surfaces of copper foil having a thickness of 20 μm, followed by drying and compression, to obtain an anode.

<Manufacture of Lithium Secondary Battery>

A non-aqueous electrolyte was prepared by dissolving $LiPF_6$ in an organic solvent containing ethylene carbonate (EC), propylene carbonate (PC) and diethyl carbonate (DEC) mixed at a ratio of 3:3:4 (volume ratio) to a concentration of 1.0M.

The cathode and anode obtained as described above and the separator of Sample A were stacked in such a manner that the separator was interposed between both electrodes.

Then, the resultant structure was received in a pouch and the electrolyte was injected thereto to obtain a lithium secondary battery according to Sample A.

Sample B

A polyethylene porous membrane having the physical properties as shown in the following Table 1 was prepared as a separator according to Sample B.

A secondary battery according to Sample B was obtained in the same manner as Sample A, except that the separator according to Sample B was used as a separator.

Sample C

A polyethylene porous membrane having the physical properties as shown in the following Table 1 was prepared as a separator according to Sample C.

A secondary battery according to Sample C was obtained in the same manner as Sample A, except that the separator according to Sample C was used as a separator.

Sample D

A polyethylene porous membrane having the physical properties as shown in the following Table 1 was prepared as a separator according to Sample D.

A secondary battery according to Sample D was obtained in the same manner as Sample A, except that the separator according to Sample D was used as a separator.

Sample E

A polyethylene porous membrane having the physical properties as shown in the following Table 1 was prepared as a separator according to Sample E.

A secondary battery according to Sample E was obtained in the same manner as Sample A, except that the separator according to Sample E was used as a separator.

Sample F

A polyethylene porous membrane having an organic/inorganic porous coating layer was prepared as a separator according to Sample F.

A secondary battery according to Sample F was obtained in the same manner as Sample A, except that the separator according to Sample F was used as a separator.

Particularly, the separator according to Sample F was obtained as follows.

First, 16 parts by weight of polyvinylidene fluoride-co-hexafluoropropylene (PVDF-HFP) as a binder polymer was added to 184 parts by weight of acetone to a solid content of 8 wt % and dissolved therein at 50° C. for about 12 hours or more to prepare a binder polymer solution. Next, a binder polymer and alumina ($Al_2O_3$) having an average particle diameter of 500 nm as inorganic nanoparticles were added at a weight ratio of 10:90 to the resultant binder polymer solution and dispersed therein to obtain slurry for a porous separator.

The resultant slurry was coated on both surfaces of the separator according to Sample A through a dip coating process and the coating thickness was controlled to about 4 μm. In this manner, a separator having porous coating layers on both surfaces thereof was obtained.

Sample G

A polyethylene porous membrane having the physical properties as shown in the following Table 1 was prepared as a separator according to Sample G.

A secondary battery according to Sample G was obtained in the same manner as Sample A, except that the separator according to Sample G was used as a separator.

Sample H

A polyethylene porous membrane having an organic/inorganic porous coating layer was prepared as a separator according to Sample H, wherein the separator according to Sample C was used as the polyethylene porous membrane.

A secondary battery according to Sample H was obtained in the same manner as Sample A, except that the separator according to Sample H was used as a separator.

Particularly, the separator according to Sample H was obtained as follows.

First, 16 parts by weight of polyvinylidene fluoride-co-hexafluoropropylene (PVDF-HFP) as a binder polymer was added to 184 parts by weight of acetone to a solid content of 8 wt % and dissolved therein at 50° C. for about 12 hours or more to prepare a binder polymer solution. Next, a binder polymer and alumina ($Al_2O_3$) having an average particle diameter of 500 nm as inorganic nanoparticles were added at a weight ratio of 10:90 to the resultant binder polymer solution and dispersed therein to obtain slurry for a porous separator.

The resultant slurry was coated on both surfaces of the separator according to Sample C through a dip coating process and the coating thickness was controlled to about 4 μm. In this manner, a separator having porous coating layers on both surfaces thereof was obtained.

Sample I

A polyethylene porous membrane having the physical properties as shown in the following Table 1 was prepared as a separator according to Sample I.

A secondary battery according to Sample I was obtained in the same manner as Sample A, except that the separator according to Sample I was used as a separator.

Sample J

A polyethylene porous membrane having the physical properties as shown in the following Table 1 was prepared as a separator according to Sample J.

A secondary battery according to Sample J was obtained in the same manner as Sample A, except that the separator according to Sample J was used as a separator.

Sample K

A polyethylene porous membrane having the physical properties as shown in the following Table 1 was prepared as a separator according to Sample K.

A secondary battery according to Sample K was obtained in the same manner as Sample A, except that the separator according to Sample K was used as a separator.

Sample L

A polyethylene porous membrane having the physical properties as shown in the following Table 1 was prepared as a separator according to Sample L.

A secondary battery according to Sample L was obtained in the same manner as Sample A, except that the separator according to Sample L was used as a separator.

TABLE 1

| Sample (separator) | Air permeability (s/100 cc) | Porosity (%) | Thickness (μm) | Weight (g/m²) | Electrical resistance (ER, Ω) |
|---|---|---|---|---|---|
| A | 121 | 48 | 11 | 5.0 | 0.38 |
| B | 81 | 48 | 11 | 4.9 | 0.32 |
| C | 150 | 41 | 11 | 5.7 | 0.42 |
| D | 244 | 45 | 11 | 7.0 | 0.84 |
| E | 153 | 41 | 11 | 7.0 | 0.61 |
| F | 115 | 45 | 19 | 10.0 | 0.40 |
| G | 109 | 46 | 11 | 5.0 | 0.36 |
| H | 137 | 40 | 19 | 8.0 | 0.43 |
| I | 202 | 44 | 11 | 6.9 | 0.78 |
| J | 161 | 46 | 11 | 5.2 | 0.40 |
| K | 220 | 45 | 11 | 4.9 | 0.49 |
| L | 180 | 43 | 11 | 5.1 | 0.44 |

In Table 1, air permeability, porosity, weight and electrical resistance (ER) were determined by the following methods.

Air Permeability

'Air permeability' means a period of time during which 100 cc of air permeates through a separator, is expressed by a unit of second/100 cc herein, may be used interchangeably with the term 'transmission', and is represented generally by Gurley value, or the like.

The air permeability was determined by the method of ASTM D726-94. Gurley used herein is resistance against air flow and is determined by a Gurley densometer. The Gurley air permeability value described herein is expressed by a time (second), i.e., air permeation time, required for 100 cc of air to pass through a cross section of 1 in² under a pressure of 12.2 inH₂O.

Porosity

'Porosity' means the ratio of volume occupied by pores based on volume of a separator. The porosity was determined according to ASTM D-2873.

Weight

A separator was cut into a dimension of 1 m (width)×1 m (length) and weighed.

Separator Resistance (ER)

A separator was sufficiently impregnated with an electrolyte containing 1M LiPF₆ in ethylene carbonate (EC)/ethyl methyl carbonate (EMC) (1:2, volume ratio), and the prepared separator was used to obtain a coin cell.

The obtained coin cell was allowed to stand at room temperature for 1 day and the electrical resistance (ER) of the separator was determined by using a method for determining impedance.

Evaluation Results (1) Evaluation of Breaking Temperature

Figure 2:
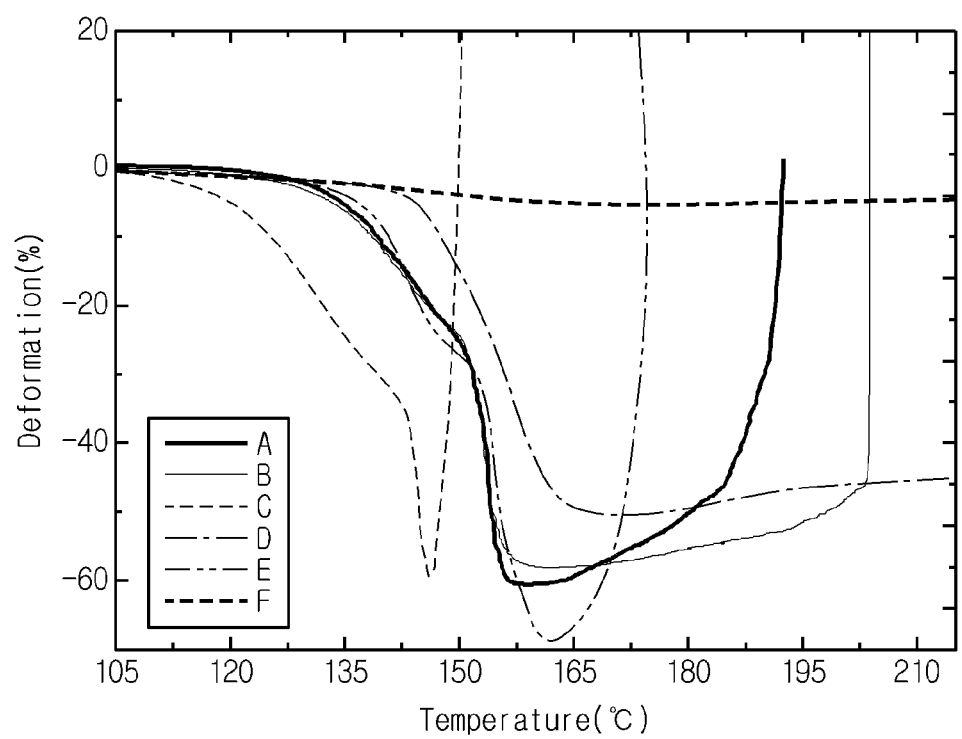
FIG. 2 is a graph illustrating a change in deformation of the separators of Samples A-F as a function of temperature.

Each of the separators according to Samples A-L was evaluated for breaking temperature. The results are shown in the following Table 2. In addition, FIG. 2 is a graph illustrating a change in deformation of the separators of Samples A-F as a function of temperature.

Herein, breaking temperature was evaluated under the following conditions.

Figure 3:
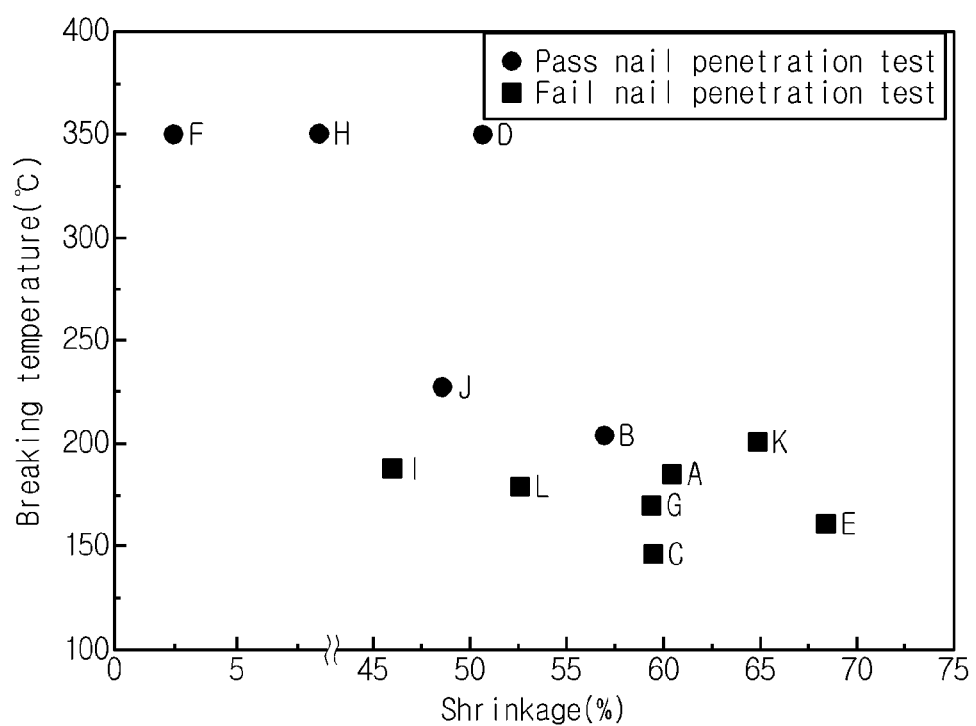
FIG. 3 is a graph illustrating the shrinkage and breaking temperature of the separators of Samples A-L.

Instrument: Q 800 system available from TA
Temperature range: 25-350° C.
Warming rate: 5° C./min
Applied load: 0.005N
Separator sample dimension: width 6.1 mm
Initial length of separator sample: 10.3 mm (2) Evaluation of Shrinkage Each of the separators according to Samples A-L was evaluated for shrinkage. The results are shown in the following Table 2. In addition, FIG. 3 is a graph illustrating the shrinkage and breaking temperature of the separators of Samples A-L.

Herein, shrinkage was evaluated by the following method.

The shrinkage of a separator sample having a width of 6.1 mm was determined within a temperature ranging from 25° C. to 350° C. at a warming rate of 5° C./min under a load of 0.005N by using dynamic mechanical analysis (DMA).

Herein, the shrinkage was calculated according to the formula of [(initial length of separator sample)−(minimum length of separator sample)/(initial length of separator sample)×100].

(3) Evaluation of Breaking Load and Elongation at Break

Figure 4:
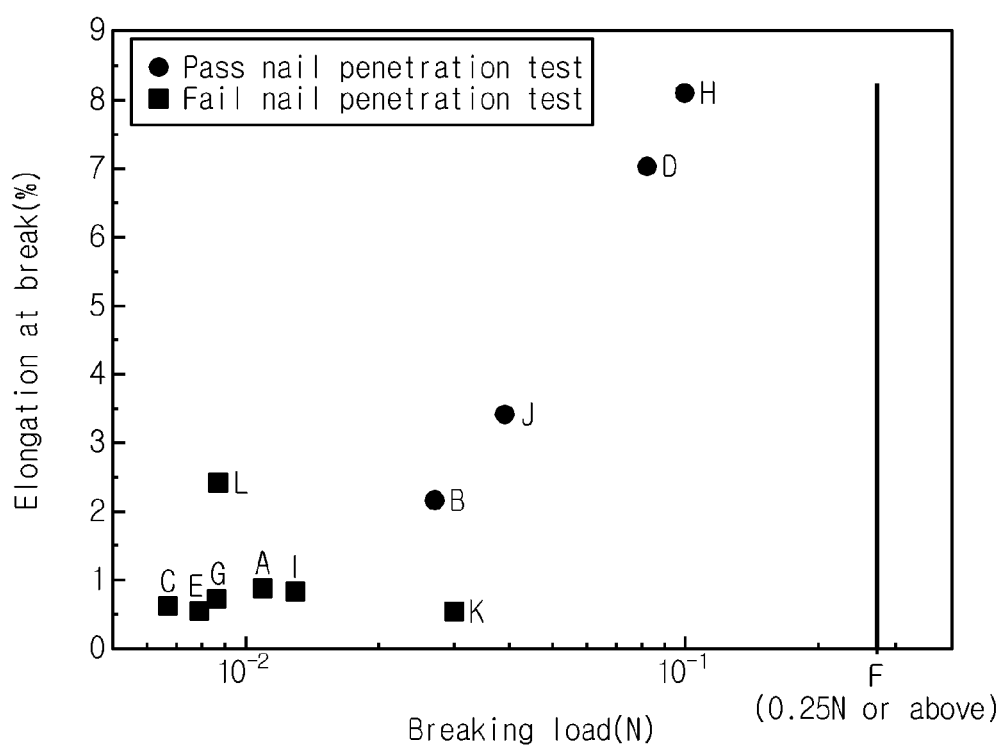
FIG. 4 is a graph illustrating the breaking load and elongation at break of the separators of Samples A-L.

Each of the separators according to Samples A-L was evaluated for breaking load and elongation at break. The results are shown in the following Table 2. FIG. 4 is a graph illustrating the breaking load and elongation at break of the separators of Samples A-L.

Herein, breaking load and elongation at break were evaluated under the following conditions.

Instrument: DMA tensile Geometry (Trade name: Q800, available from TA)
Temperature: maintained at 200° C.
Separator sample dimension: width 6.1 mm (fixed), initial length of separator sample: 10 mm
A separator sample was loaded to DMA tensile Geometry and the load and elongation were determined until break-off occurred while increasing load gradually from 0.002N at a rate of 0.001N/min.
The elongation and load at break of a separator were recorded and the physical properties were compared with the standards.

(4) Evaluation of Nail Penetration Stability of Secondary Battery

Each of the secondary battery according to Samples A-L was fully charged under a voltage of 4.25V at 25° C., a nail having a diameter of 3 mm was allowed to penetrate through the center of each battery, and it was observed whether ignition occurred or not. Herein, the nail penetration rate was 80 mm/sec. The results are shown in the following Table 2.

TABLE 2

| Sample | Breaking temperature (° C.) | Shrinkage (%) | Breaking load (N) | Elongation at break (%) | Nail penetration test |
|---|---|---|---|---|---|
| A | 185.1 | 60.5 | 0.011 | 0.88 | Ignition (fail) |
| B | 203.9 | 57 | 0.027 | 2.17 | No ignition (pass) |
| C | 146.2 | 59.5 | 0.0067 | 0.62 | Ignition (fail) |
| D | Not broken | 50.7 | 0.082 | 7.03 | No ignition (pass) |
| E | 161.3 | 68.4 | 0.0079 | 0.56 | Ignition (fail) |
| F | Not | 2.5 | 0.25 | Not | No ignition (pass) |

TABLE 2-continued

| Sample | Breaking temperature (° C.) | Shrinkage (%) | Breaking load (N) | Elongation at break (%) | Nail penetration test |
|---|---|---|---|---|---|
| | broken | | | broken | |
| G | 169.7 | 59.4 | 0.0086 | 0.73 | Ignition (fail) |
| H | Not broken | 8.4 | 0.10 | 8.10 | No ignition (pass) |
| I | 187.8 | 46.0 | 0.013 | 0.84 | Ignition (fail) |
| J | 227.2 | 48.6 | 0.039 | 3.42 | No ignition (pass) |
| K | 204.5 | 65.1 | 0.030 | 0.52 | Ignition (fail) |
| L | 181.1 | 52.2 | 0.009 | 2.41 | Ignition (fail) |

Referring to Table 2, when a separator satisfies the conditions of a breaking temperature of 200° C. or higher and a shrinkage of 59% or less in the results of evaluation of breaking temperature and shrinkage of a separator using DMA, a secondary battery including the separator also passes the nail penetration test. On the contrary, when a separator does not satisfy at least one of the conditions of a breaking temperature of 200° C. or higher and a shrinkage of 59% or less in the results of evaluation of breaking temperature and shrinkage of a separator, a secondary battery including the separator fails the nail penetration test.

In addition, when a separator satisfies the conditions of a breaking load of 0.02N or more and an elongation at break of 1% or more in the results of evaluation of breaking load and elongation at break of a separator using DMA, a secondary battery including the separator also passes the nail penetration test. On the contrary, when a separator does not satisfy at least one of the conditions of a breaking load of 0.02N or more and an elongation at break of 1% or more in the results of evaluation of breaking load and elongation at break of a separator, a secondary battery including the separator fails the nail penetration test.

Although Samples F, H and D were not broken when determining the breaking temperature, the breaking temperature is shown at 350° C. in FIG. 3. This is not an actual breaking temperature. However, since the breaking temperature was evaluated within a temperature ranging from 25° C. to 350° C. and Samples F, H and D were not broken at the highest temperature of 350° C., the breaking temperature is shown simply at 350° C.

In addition, FIG. 4 shows the results of evaluation of breaking load and elongation at break. Referring to FIG. 4, although Samples B, J, D, H and F passed the nail penetration test, only Sample F was not broken in the evaluation of breaking load and elongation at break and the remaining Samples B, J, D and H were broken. Referring to FIG. 4 with reference to Samples B, J, D and H broken in the same manner, Samples H, D, J and B show a higher breaking load and elongation at break in the order named. This particularly suggests that Samples H, D, J and B have relatively higher stability in the order named.

It can be seen from the foregoing that the method for evaluating the stability of a separator according to the present disclosure can predict the stability of a secondary battery accurately from the results of evaluation of breaking temperature and shrinkage, or breaking load and elongation at break, based on DMA of the separator itself, while avoiding a need for assembling an actual secondary battery and carrying out a nail penetration test.

What is claimed is:

1. A method for evaluating a stability of a separator for a secondary battery, which can predict a safety of the separator against explosion before a nail penetration test of the secondary battery, the method providing results matched with results of the nail penetration test for the secondary battery including the separator, the method comprising the steps of:
preparing the separator;
determining elongation properties of the separator by using dynamic mechanical analysis (DMA), including determining a breaking load and elongation condition by subjecting the separator to a load of 0.002N at a rate of 0.001N/min at a temperature of 200° C.;
comparing the determined elongation properties of the separator with predetermined stability standards; and
classifying the separator as a stability-passing separator when the determined elongation properties satisfy the stability standards, and classifying the separator as a stability-failing separator when the determined elongation properties do not satisfy the stability standards, after the comparison,
wherein the separator includes a porous polymer substrate separator, an organic/inorganic composite separator which has a porous coating layer disposed on at least one surface of the porous polymer substrate, or a combination of the porous polymer substrate separator and the organic/inorganic composite separator,
wherein the elongation properties are a breaking temperature and a shrinkage of the separator, and the stability standards are a breaking temperature of 200° C. or higher and a shrinkage of 59% or less, and
wherein the elongation properties are the breaking load and elongation at a break of the separator, and the stability standards are a breaking load of 0.02N or more and an elongation at break of 1% or more.

2. The method for evaluating the stability of the separator according to claim 1, the method further comprising:
when the nail penetration test is performed by fully charging the secondary battery at 25° C. under a voltage of 4.25V, penetrating a nail having a diameter of 3 mm through the center of the battery, and
evaluating the battery as failing the nail penetration test, when it causes ignition, and the battery as passing the nail penetration test when it causes no ignition.

3. The method for evaluating the stability of the separator according to claim 1, wherein the separator has a width of 6.1 mm and a length of 10 mm.

* * * * *